(12) United States Patent
Kang et al.

(10) Patent No.: US 11,971,422 B2
(45) Date of Patent: Apr. 30, 2024

(54) DIGITAL SLIDE SCANNER SAMPLE IDENTIFICATION DEVICE AND METHOD

(71) Applicant: MOTIC CHINA GROUP CO., LTD., Fujian (CN)

(72) Inventors: Jun Kang, Fujian (CN); Jianping Jiang, Fujian (CN); Muwang Chen, Fujian (CN)

(73) Assignee: MOTIC CHINA GROUP CO., LTD., Fujian (CN)

( * ) Notice: Subject to any disclaimer, the term of this patent is extended or adjusted under 35 U.S.C. 154(b) by 363 days.

(21) Appl. No.: 17/427,627

(22) PCT Filed: Oct. 17, 2019

(86) PCT No.: PCT/CN2019/111549
§ 371 (c)(1),
(2) Date: Jul. 30, 2021

(87) PCT Pub. No.: WO2020/244119
PCT Pub. Date: Dec. 10, 2020

(65) Prior Publication Data
US 2022/0099691 A1 Mar. 31, 2022

(30) Foreign Application Priority Data
Jun. 3, 2019 (CN) .......................... 201910478694.2

(51) Int. Cl.
*G06K 7/10* (2006.01)
*G01N 35/00* (2006.01)

(52) U.S. Cl.
CPC . *G01N 35/00732* (2013.01); *G01N 35/00029* (2013.01); *G06K 7/10336* (2013.01);
(Continued)

(58) Field of Classification Search
CPC ....... G01N 35/00732; G01N 35/00029; G01N 2035/00138; G01N 2035/00782;
(Continued)

(56) References Cited

U.S. PATENT DOCUMENTS

| 2016/0021100 A1* | 1/2016 | Hoyer | H04W 12/35 726/10 |
| 2016/0209319 A1 | 7/2016 | Adalsteinsson et al. | |
| 2020/0184167 A1* | 6/2020 | Vink | G06K 7/10722 |

FOREIGN PATENT DOCUMENTS

| CN | 102590155 A | 7/2012 |
| CN | 102854615 A | 1/2013 |

(Continued)

*Primary Examiner* — Suman K Nath
(74) *Attorney, Agent, or Firm* — Cooper Legal Group, LLC

(57) ABSTRACT

The invention discloses a digital slide scanner sample identification device, and relates to the digital slide scanner for solving the problem that a bar code scanner can normally read a bar code label through the light contact, and the samples cannot be read due to the shielding of the bar code since the samples are stored in the digital slide scanner or scanning samples are stacked. The device comprises a digital slide scanner, and scanning samples; a near-field communication NFC read-write module is arranged in the digital slide scanner, and a NFC label is arranged on each scanning sample. By using the NFC technology, the NFC label data in a large amount of scanning samples can be read within short time, a feedback indication can be provided, and the working efficiency is greatly improved. The invention further discloses a digital slide scanner sample identification method.

11 Claims, 5 Drawing Sheets

(52) U.S. Cl.
CPC ............... *G06K 7/10356* (2013.01); *G01N 2035/00138* (2013.01); *G01N 2035/00782* (2013.01); *G01N 2035/00831* (2013.01)

(58) Field of Classification Search
CPC ..... G01N 2035/00831; G06K 7/10336; G06K 7/10356; G06K 7/10009; G06K 7/10297; H04W 4/80
See application file for complete search history.

(56) References Cited

FOREIGN PATENT DOCUMENTS

| | | |
|---|---|---|
| CN | 208061233 U | 11/2018 |
| CN | 109063792 A | 12/2018 |
| CN | 110196338 A | 9/2019 |

\* cited by examiner

DIGITAL SLIDE SCANNER SAMPLE IDENTIFICATION DEVICE AND METHOD

FIELD OF THE INVENTION

The invention relates to the digital slide scanner, in particular to a digital slide scanner sample identification device and method.

DESCRIPTION OF THE RELATED ART

With the development of digital technology, digital slicing technology is becoming more and more widely used. Every day, a large amount of samples need to be scanned into digital slides, making the scanning capacity of digital slide scanners larger and larger, ranging from dozens to thousands.

In the prior art, digital slide scanners usually use bar code labels to identify scanning samples, that is, a bar code is affixed to each scanning sample, a bar code scanner is used to obtain bar code information, and then the corresponding sample than this information is found. In this way, a bar code scanner can normally read a bar code label through the light contact, and the samples cannot be read due to the shielding of the bar code since the samples are stored in the digital slide scanner or scanning samples are stacked. In addition, scanning massive bar code labels and comparing and searching is also a very large workload. In addition, bar code labels can only be read in one direction, but data cannot be written, which is not flexible and convenient in use.

Finding a specific sample from a large amount of scanning samples has always been a time-consuming and laborious task, and the technology disclosed in the invention solves this problem well.

SUMMARY OF THE INVENTION

The digital slide scanner sample identification device disclosed by the invention overcomes the deficiencies of the prior art. In the invention, the NFC technology is used to realize the identification of scanning samples. NFC (Near Field Communication) technology allows data to be exchanged close to each other, which is one of the non-contact RFID (Radio Frequency Identification) technologies. NFC technology is a short-range, high-frequency radio technology that runs at a distance within 20 cm at 13.56 MHz and can exchange data without mechanical contact or optical contact.

The invention provides a digital slide scanner, wherein an NFC (Near Field Communication) read-write module is arranged therein, and multiple NFC induction antennas are arranged; these NFC induction antennas are distributed in the digital slide scanner, and an NFC induction antenna is arranged at where each scanning sample is placed. An NFC label is arranged on each scanning sample; when a scanning sample is loaded into the digital slide scanner, the NFC label on the scanning sample is just within the reading and writing area of the NFC induction antenna. Each NFC induction antenna can and can only read and write the corresponding NFC label on the scanning sample.

When the digital slide scanner is working, through an antenna switching circuit, the NFC read-write module is only connected to one NFC induction antenna at any time, and then the NFC read-write module reads and writes the NFC label on the scanning sample corresponding to the NFC induction antenna. After completion, the antenna switching circuit is switched to the next NFC induction antenna; and so on, the reading and writing of NFC labels of all scanning samples are realized. Since the NFC reading and writing speed is very fast (about 15 milliseconds), hundreds of NFC label can be read and written in a few seconds.

By reading and writing the NFC label on each scanning sample in real time, the digital slide scanner can perceive the user's operation on each scanning sample, such as loading a new scanning sample and taking out the scanned sample, and can accurately obtain the number of scanning samples in the current digital slide scanner. When the user needs to search for a specific sample, as long as the filtering conditions are entered, the digital slide scanner can compare the data of the read NFC label, quickly find the target sample, and give feedback (through the indicator light or figure) to inform the user of the specific location of the sample.

The invention discloses a digital slide scanner sample identification device, wherein: scanning samples are placed inside the digital slide scanner in a vertical stack. An NFC label is placed on the side of each scanning sample, and information about the scanning sample can be stored in the NFC label.

The digital slide scanner is provided with an NFC read-write module circuit board, and an MCU microprocessor, a communication module, an NFC read-write module, a multi-channel NFC induction antenna and an antenna switching circuit are provided thereon. The number of NFC induction antennas is related to the number of scanning samples that can be accommodated by the digital slide scanner, to ensure that each scanning sample has a unique NFC induction antenna corresponding thereto. The NFC read-write module circuit board is vertically erected and fixed on the side of the stacked scanning samples with the NFC label; at this time, the multi-channel NFC induction antenna on the NFC read-write module circuit board is exactly aligned with the NFC label on the scanning sample. Each NFC induction antenna only reads the corresponding NFC label (the closest NFC label).

The induction switching circuit on the NFC read-write module circuit board only enables one NFC induction antenna to communicate with the NFC read-write module at a time, and the NFC read-write module reads and writes data of the NFC label on the scanning sample corresponding to this NFC induction antenna. After the reading is completed, the next NFC induction antenna is enabled, and the cycle is always repeated in this way, so as to realize the real-time reading of NFC labels of all scanning samples.

The scanning samples in the digital slide scanner are stacked, so the NFC labels therein are also arranged close to each other.

It should be pointed out that in order to prevent the NFC read-write module from simultaneously sensing multiple adjacent NFC labels (which will cause the digital slide scanner to be unable to determine which scanning sample is currently operated), there are the following three measures: first, adjusting the antenna design of the NFC read-write module circuit board so that it has a suitable induction distance; when an antenna is enabled, only the NFC label on the scanning sample corresponding to this antenna can be read; in practice, the distance between the NFC read-write module and the corresponding NFC label is adjusted to 0 mm-9 mm, and the distance between the NFC read-write module and the corresponding NFC label is preferably adjusted to 5 mm.

Second, increasing isolation and shielding measures, such as adding partitions between multiple antennas to play a shielding role.

Third, adjusting the transmission power of the NFC read-write module so that the induction distance is within an appropriate range.

Compared with the existing technology, the digital slide scanner of the invention uses NFC technology, which can read data of NFC labels in a large amount of scanning samples in a very short time (there is no need to worry about whether the label is blocked) and give feedback indicators, so that it can accurately obtain the number of scanning samples in the current digital slide scanner, which greatly improves the work efficiency. Moreover, the NFC label can also write data, and information can be entered at any time during the scanning of the digital slide, which enables the digital slide scanner to be more intelligent.

BRIEF DESCRIPTION OF THE DRAWINGS

The invention can be further illustrated by the non-limiting embodiments given in the drawings.

Figure 1:
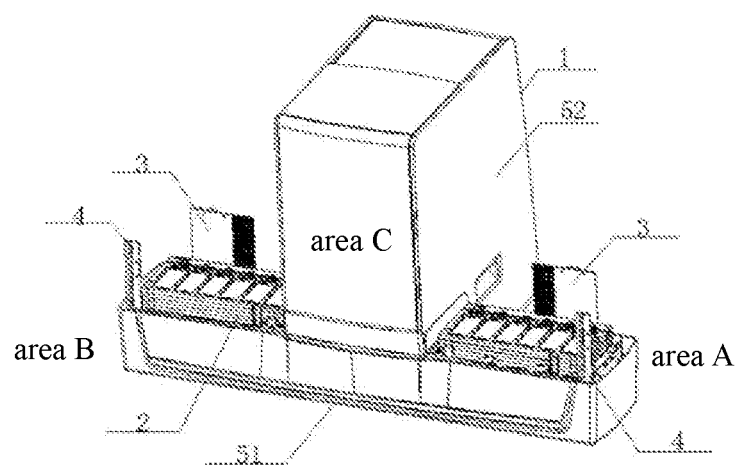
FIG. 1 is a schematic view illustrating the three-dimensional structure of the invention.

The main reference numerals are as follows:

digital slide scanner 1; scanning sample 2; slide tray 21; slide 22; NFC label 23; scan waiting area A; scan imaging area C; scan completing area B; NFC read-write module circuit board 3; NFC induction antenna 31; NFC read-write module 32; antenna switching circuit 33; communication module 34; microprocessor 35; LED indicator board 4; imaging scanning base 51; imaging scanning box 52; base casing 53; scanner base plate 54; feeding bracket 55; feeding screw 56; feeding slide bar 57; feeding slider 58; notch 59.

DETAILED DESCRIPTION OF THE PREFERRED EMBODIMENTS

In order to enable those skilled in the art to better understand the invention, the technical solutions of the invention will be further described hereinafter with reference to the drawings and embodiments.

Embodiment 1

As shown in FIGS. 1, 2, 3, 4, and 5, a digital slide scanner sample identification device, comprising a digital slide scanner and scanning samples, wherein a near-field communication NFC read-write module is arranged in the digital slide scanner, and an NFC label is arranged on each scanning sample;

in specific work, the digital slide scanner communicates with the NFC label on each scanning sample through the near-field communication NFC read-write module, to access the relevant information of each scanning sample, which helps the digital slide scanner to obtain and memorize the relevant information and scanning status of each scanning sample, and helps the user to quickly locate and screen the position and relevant information of a specific sample in a large amount of scanning samples.

With Near Field Communication (NFC) technology, the digital slide scanner and the scanning sample can read and store the relevant information of the scanning sample without mechanical or optical contact, which helps the digital slide scanner to quickly find, locate, and classify scanning samples, thereby improving the efficiency and intelligence of digital slide scanning.

The invention further comprises NFC induction antennas; the NFC read-write module can be corresponding to multiple NFC induction antennas;

in specific work, through the method of antenna switching, different NFC induction antennas are time-shared to be connected to the NFC read-write module to realize reading and writing of NFC labels corresponding to all NFC induction antennas; through the method of antenna switching, the number of NFC read-write modules can be reduced.

The number of NFC induction antennas is related to the maximum number of scanning samples that can be accommodated by the digital slide scanner, to ensure that when scanning samples are stacked, each scanning sample has a unique NFC induction antenna corresponding thereto.

The number of the NFC read-write module can be one or more; when the maximum number of scanning samples that can be accommodated by the digital slide scanner is small, only one NFC read-write module can be used; when the number of scanning samples is large, multiple NFC read-write modules can be used; each NFC read-write module corresponds to reading and writing several NFC induction antennas, and multiple NFC read-write modules can work simultaneously to realize reading and writing of multiple NFC labels at the same time to obtain faster reading and writing speed and more economical cost.

The distance between the NFC read-write module and the corresponding NFC label is 0 mm-9 mm. The distance is adjusted to the range of 0 mm-9 mm, to ensure that each scanning sample has a unique NFC induction antenna corresponding thereto.

A memory is arranged in the NFC label. Through the memory, relevant information such as sample ID, patient name, scanning time, scanning status (success scanning, failure scanning) and so on can be memorized.

Embodiment 2

As a preferred embodiment 2 of the technical solution, as shown in FIG. 1, a digital slide scanner 1 and scanning samples 2, wherein a near-field communication NFC read-write module is arranged in the digital slide scanner 1, and an NFC label 23 is arranged on each scanning sample 2; the digital slide scanner 1 is divided into three areas, wherein: the area A shown is a scan waiting area A, which can accommodate multiple scanning samples 2 to be scanned; the area C shown is a scan imaging area C, and the core components of the digital slide scanner such as the optical system, illumination system, mechanical system, and electronic control system of the digital slide scanner 1 are located in this area, which is the part that realizes the digital slide scanning imaging; the area B shown is a scan completing area B, which can accommodate multiple scanned samples 2.

As shown in FIG. 1, scanning samples 2 are vertically stacked and arranged neatly inside the digital slide scanner 1, and scanning samples 2 are in contact with each other without any obstruction in the middle. When the scanning does not start, all scanning samples 2 are stacked in the scan waiting area A to wait for scanning. When the scanning is in progress, the scanning sample 2 at the lowermost layer of the scan waiting area A is transported to the scan imaging area C for scan imaging; as the scanning sample 2 at the lowermost layer of the scan waiting area A is removed, the remaining scanning samples 2 in the scan waiting area A are dropped to the bottom layer by gravity. The scanning sample 2 is scanned in the scan imaging area C; after the scanning is completed, the scanning sample 2 is transported to the scan completing area B and is inserted from the bottom layer of the existing stacked scanning samples in the scan completing area B; as the scanning sample 2 is inserted, the existing scanning samples 2 in the scan completing area B are then lifted. The scanning process is completed, and the above process is repeated until all samples are scanned.

As shown in FIG. 1, the scan waiting area A and the scan completing area B of the digital slide scanner 1 are provided with a NFC read-write module circuit board 3, respectively, and the NFC read-write module circuit board 3 is vertically erected and fixed on the outside (the side with the NFC label) of the stacked scanning samples 2.

As shown in FIG. 1, the scan waiting area A and the scan completing area B of the digital slide scanner 1 are further provided with an LED indicator board, respectively; the LED indicator board 4 is controlled by the NFC read-write module, and there are several LEDs on the LED indicator board 4; the number of LEDs is equivalent to the maximum number of scanning samples (17 in this embodiment) that can be accommodated in the scan waiting area A and the scan completing area B of the digital slide scanner; each LED on the LED indicator board is used to indicate the status of the corresponding scanning sample; when there is no scanning sample at the corresponding position, the LED goes off; when the scanning sample at the corresponding position is not scanned, the LED is blue; when the scanning of the scanning sample at the corresponding position is completed, the LED is green; when the scanning of the scanning sample at the corresponding position is abnormal, the LED is red; when there is a scanning sample that is matched with the search condition at the corresponding location, the LED is yellow.

Embodiment 3

Figure 2:
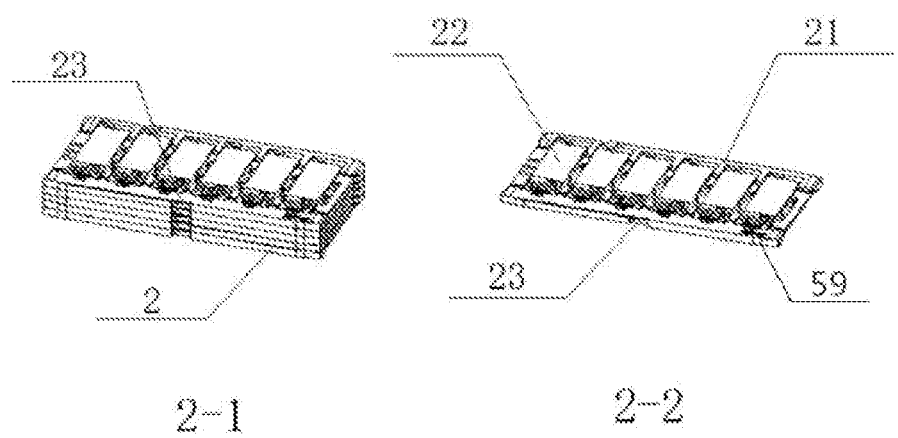
FIG. 2 is a schematic view illustrating the vertically stacked multiple scanning samples and a single scanning sample of the invention.

As a preferred embodiment 3 of the technical solution, as shown in FIG. 2, FIG. 2-1 shows a situation where multiple scanning samples 2 are stacked, and FIG. 2-2 shows a single scanning sample 2. In the embodiment, the scanning sample 2 is composed of a slide 22, a slide tray 21, and an NFC label 23. The slide 22 is placed in the slide tray 21, and each slide tray 21 can accommodate 6 slides 22. Of course, the number of slides 22 that the slide tray 21 can accommodate can also be adjusted according to actual needs. An NFC label 23 is arranged on one side of the slide tray 21, as shown in FIG. 2-2. When multiple scanning samples 2 are vertically stacked, the NFC labels 23 on the scanning samples 2 are also vertically stacked (as shown in FIG. 2-1).

Embodiment 4

Figure 3:
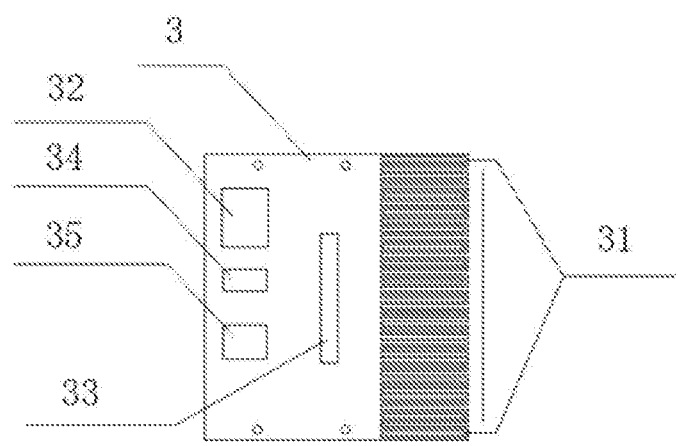
FIG. 3 is a schematic view illustrating the NFC read-write module circuit board of the invention.

As a preferred embodiment 4 of the technical solution, as shown in FIG. 3, which is the NFC read-write module circuit board 3, and a plurality of NFC induction antennas 31 are vertically arranged on the right side thereof; the number of antennas is the same as the maximum number of scanning samples 2 that the digital slide scanner 1 can accommodate in the scan imaging area A and the scan completing area B (17 in the embodiment), and is also the same as the number of LEDs on the LED indicator board 4. The height dimension of the NFC induction antenna 31 is the same as the thickness of the scanning sample 2; when the scanning samples 2 are vertically stacked, the NFC induction antenna can be just corresponding to the NFC label on the scanning sample 2 one by one. By adjusting the transmission power of the NFC read-write module 32 and changing the design of the NFC induction antenna 31 on the NFC read-write module circuit board 3, when the distance between the NFC induction antenna 31 and the NFC label on the scanning sample 2 is 5 mm, the NFC label 23 can be read and written normally without misreading the NFC label 23 on the other adjacent scanning samples 2.

As shown in FIG. 3, an MCU (Microcontroller Unit) microprocessor 35, a communication module 34, an NFC read-write module 32, and an antenna switching circuit 33 are provided on the NFC read-write module circuit board 3. The MCU microprocessor 35 is the control core and controls the other parts to work together. The communication module 34 is responsible for communicating with the host computer, receiving control commands from the host computer, and reading and writing NFC labels.

In the NFC read-write module circuit board 3 of the embodiment, there are 17 NFC induction antennas arranged neatly on the right side of the circuit board, and the size is just matched with the scanning sample 2; when the NFC read-write module circuit board 3 and the scanning sample 2 are placed as shown in FIG. 1, each NFC induction antenna 31 on the NFC read-write module circuit board 3 is just aligned with the NFC label 23 on a single scanning sample 2.

The antenna switching circuit 33 can enable different NFC induction antennas 31 with the NFC read-write module 32 (only one NFC induction antenna 31 is enabled at a time); at this time, the NFC read-write module 32 can only read and write the NFC label corresponding to the NFC induction antenna 31. When the NFC read-write module circuit board 3 is in normal operation, the MCU microprocessor 35 controls the antenna switching circuit 33 to cyclically switch the NFC induction antenna 31 (only one channel of the NFC induction antenna 31 is enabled with the NFC read-write module 32 at a time); after the gating, the NFC read-write module 32 is controlled to read and write the NFC label 23 on the scanning sample 2. When the scanning sample 2 changes, such as the scanning sample 2 is taken out from or placed in the digital slide scanner 1, or the scanning sample 2 leaves the scan waiting area A and enters the scan imaging area C, the NFC read-write module circuit board 3 can always detect the change of the NFC label 23, and then it can control the LED indicator board 4 to change the LED status, and report it to the host computer through the communication module 34.

Embodiment 5

Figure 4:
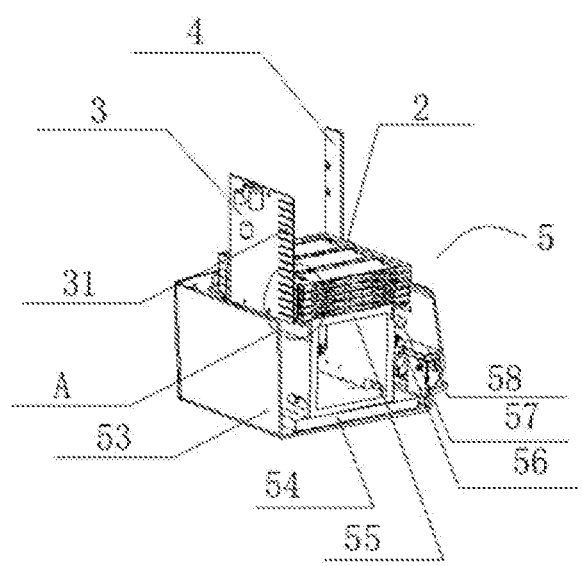
FIG. 4 is a sectional view illustrating the NFC functional area of the invention.
Figure 5:
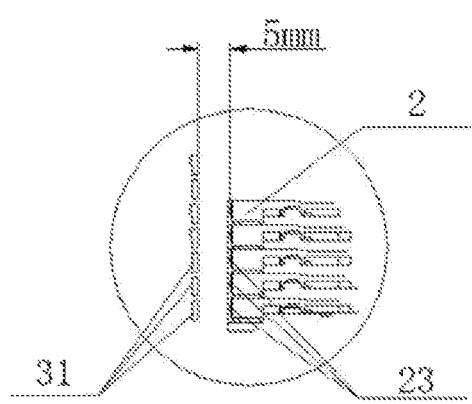
FIG. 5 is a partial enlarged view of A in FIG. 4.

As a preferred embodiment 5 of the technical solution, as shown in FIGS. 4 and 5, which are sectional views illustrating the three-dimensional structure of the scan waiting area A of the digital slide scanner. Scanning samples 2 are stacked vertically in the digital slide scanner 1, and the NFC read-write circuit board 3 stands vertically on the side (the side with the NFC label 23) of the stacked scanning samples 2. The area circled at A is enlarged and displayed on the right; as shown in the figure, the NFC induction antenna 31 on the NFC read-write circuit board 3 is corresponding to each NFC label 23 on the stacked scanning samples 2 one by one and is neatly arranged. Each NFC induction antenna 31 is corresponding to an NFC label 23, and the distance between the two is about 5 mm; this distance can ensure that the NFC read-write module 32 will not misread the NFC label 23 on the other adjacent scanning samples 2.

When the digital slide scanner 1 is working, the NFC read-write module circuit board 3 always switches the NFC induction antenna in real time. The changes of all NFC labels in the digital slide scanner 1 are scanned to perceive the operation of the user or the digital slide scanner 1 on the scanning sample 2, and feed back to the user through the LED position and color on the LED indicator board 4, which facilitates the user to understand the status of all scanning samples 2 in the digital slide scanner 1. During the scanning process, the digital slide scanner 1 can also memorize the scanning information in the NFC label 23 of the scanning sample 2 at any time. When the user needs to search for and filter a specific scanning sample 2, the digital slide scanner 1 can quickly find out the target according to the NFC label information read by the NFC read-write module circuit board 3. Through the technology disclosed in the invention, the working efficiency and intelligence of the digital slide scanner can be improved.

In Embodiment 1, Embodiment 2, Embodiment 3, Embodiment 4, and Embodiment 5, compared with Embodiment 1, in Embodiment 2, the scan waiting area A and the scan completing area B of the digital slide scanner 1 are provided with a NFC read-write module circuit board 3, respectively, and the NFC read-write module circuit board 3 is vertically erected and fixed on the outside of the stacked scanning samples 2, to ensure that each scanning sample has a unique NFC induction antenna corresponding thereto. Compared with Embodiment 1, in Embodiment 3, the scanning sample 2 is composed of a slide 22, a slide tray 21, and the number of slides 22 that the slide tray 21 can accommodate can also be adjusted according to actual needs. Compared with Embodiment 1, in Embodiment 4, by adjusting the transmission power of the NFC read-write module 32 and changing the design of the NFC induction antenna 31 on the NFC read-write module circuit board 3, when the distance between the NFC induction antenna 31 and the NFC label on the scanning sample 2 is 5 mm, the NFC label 23 can be read and written normally without misreading the NFC label 23 on the other adjacent scanning samples 2. Compared with Embodiment 1, in Embodiment 5, the NFC read-write module circuit board 3 always switches the NFC induction antenna in real time, and scans the changes of all NFC labels in the digital slide scanner 1, to quickly find the target therefrom.

A sample identification method of the digital slide scanner, comprising the following steps:

S1, equipment assembling: the equipment comprises a digital slide scanner and scanning samples, wherein a near-field communication NFC read-write module is arranged in the digital slide scanner, and a NFC label is arranged on each scanning sample; the digital slide scanner comprises an optical system, an illumination system, a mechanical system, and an electronic control system; from right to left of the digital slide scanner, it is sequentially a scan waiting area A, a scan imaging area C, and a scan completing area B;

The structure of the scan waiting area A of the digital slide scanner 1 is almost the same as that of the scan completing area B. Taking the case of scan waiting area A as an example, it comprises a base casing 53 and a scanner base plate 54 provided on the base casing 53. Three rubber feet are fixed under the scanner base plate 54 and placed on the desktop. The feeding bracket 55 is provided on the bottom base plate 54 of the scanner. The base casing 53 is provided with feeding slide bars 57 toward the inside of the feeding bracket 55, and a feeding screw 56 is provided between the feeding slide bars 57, wherein there are two feeding slide bars 57 and one feed screw 56, and the three are parallel to each other. A feeding slider 58 is fixed on the nut of the feeding screw 56 and the two feeding slide bars 57 pass through the opening of the feeding slider 58. The opening on the feeding slider 58 is in tight fit with the feeding slide bar 57; the feeding slider 58 can move smoothly on the feeding slide bar 57, and the gap between the two should be within a reasonable range so as not to cause the feeding slider 58 to shake. A clamping clip (not shown in the figure) is fixed on the feeding slider 58. When the scanning sample 2 is placed on the feeding bracket 55, the clamping clip is just buckled at the position of the notch 59 on the scanning sample 2, and when the clamping clip moves, the scanning sample 2 can move accordingly. Therefore, when the motor drives the feeding screw 56 to move, the feeding screw 56 drives the feeding slider 58 to move, and the clamping clip then drives the scanning sample 2 to move on the feeding bracket 55, so as to realize the movement of the scanning sample in the scan waiting area A, the scan imaging area C, and the scan completing area B.

S2, data reading: the digital slide scanner communicates with the NFC label on each scanning sample through the near-field communication NFC read-write module, to access the relevant information of each scanning sample, which helps the digital slide scanner to obtain and memorize the relevant information and scanning status of each scanning sample, and helps the user to quickly locate and screen the position and relevant information of a specific sample in a large amount of scanning samples;

S3, real-time monitoring: by reading and writing the NFC label on each scanning sample in real time, the digital slide scanner can perceive the user's operation on each scanning sample, such as loading a new scanning sample and taking out the scanned sample, and can accurately obtain the number of scanning samples in the current digital slide scanner; when the user needs to search for a specific sample, as long as the filtering conditions are entered, the digital slide scanner can compare the data of the read NFC label, quickly find the target sample, and give feedback through the indicator light or figure to inform the user of the specific location of the sample;

S4, samples scanning: scanning samples are vertically stacked and arranged neatly inside the digital slide scanner 1, and scanning samples are in contact with each other without any obstruction in the middle. When the scanning does not start, all scanning samples are stacked in the scan waiting area A to wait for scanning. When the scanning is in progress, the scanning sample at the lowermost layer of the scan waiting area A is transported to the scan imaging area C for scan imaging; as the scanning sample at the lowermost layer of the scan waiting area A is removed, the remaining scanning samples in the scan waiting area A are dropped to the bottom layer by gravity. The scanning sample is scanned in the scan imaging area C; after the scanning is completed, the scanning sample is transported to the scan completing area B and is inserted from the bottom layer of the existing stacked scanning samples in the scan completing area B; as the scanning sample is inserted, the existing scanning samples in the scan completing area B are then lifted. The scanning process is completed, and the above process is repeated until all samples are scanned. It should be noted that the above steps are not limited by the order.

In step 2 data reading of the preferred embodiment, through the method of antenna switching, different NFC induction antennas are time-shared to be connected to the NFC read-write module to realize reading and writing of NFC labels corresponding to all NFC induction antennas; through the method of antenna switching, the number of NFC read-write modules can be reduced;

the number of NFC induction antennas is consistent with the maximum number of scanning samples that can be accommodated by the digital slide scanner, to ensure that each scanning sample has a unique NFC induction antenna corresponding thereto;

the number of the NFC read-write module can be one or more; when the maximum number of scanning samples that can be accommodated by the digital slide scanner is small, only one NFC read-write module can be used; when the number of scanning samples is large, multiple NFC read-write modules can be used; each NFC read-write module corresponds to reading and writing several NFC induction antennas, and multiple NFC read-write modules can work simultaneously to realize reading and writing of multiple NFC labels at the same time;

the distance between the NFC read-write module and the corresponding NFC label is 0 mm-9 mm;

a memory is arranged in the NFC label;

in specific work, through an antenna switching circuit, the NFC read-write module is only connected to one NFC induction antenna at any time, and then the NFC read-write module reads and writes the NFC label on the scanning sample corresponding to the NFC induction antenna; after completion, the antenna switching circuit is switched to the next NFC induction antenna; and so on, the reading and writing of NFC labels of all scanning samples are realized.

In step 2 data reading of the preferred embodiment, the multi-channel NFC induction antenna on the NFC read-write module is provided with a metal partition between each two.

In step 2 data reading of the preferred embodiment, the scan waiting area A and the scan completing area B are further provided with an LED indicator board, respectively; the LED indicator board is controlled by the NFC read-write module, and there are several LEDs on the LED indicator board 4; the number of LEDs is equivalent to the maximum number of scanning samples that can be accommodated in the scan waiting area A and the scan completing area B of the digital slide scanner; each LED on the LED indicator board is used to indicate the status of the corresponding scanning sample; when there is no scanning sample at the corresponding position, the LED goes off; when the scanning sample at the corresponding position is not scanned, the LED is blue; when the scanning of the scanning sample at the corresponding position is completed, the LED is green; when the scanning of the scanning sample at the corresponding position is abnormal, the LED is red; when there is a scanning sample that is matched with the search condition at the corresponding location, the LED is yellow;

in specific work, through the different colors of the LEDs on the LED indicator board, the user of the digital slide scanner can quickly understand and locate the position and status of each scanning sample.

The digital slide scanner sample identification device and method provided by the invention has been described in detail hereinabove. The description of specific embodiments is only used to help understand the method of the invention and the core idea thereof. It should be noted that those of ordinary skill in the art can make some improvements and modifications without departing from the principles of the invention, which shall fall within the protection scope of the claims of the invention.

What is claimed is:

1. A digital slide scanner of sample identification device, comprising: a digital slide scanner and samples, wherein a near-field communication (NFC) read-write module is arranged in the digital slide scanner, and an NFC label is arranged on each sample;

the digital slide scanner communicates with the NFC label on each scanning sample through the near-field communication (NFC) read-write module, to access the relevant information of each scanning sample, which makes the digital slide scanner to obtain and memorize the relevant information and scanning status of each scanning sample, and makes the user to quickly locate and screen the position and relevant information of a specific sample in a large amount of scanning samples;

wherein the device further comprises NFC induction antennas; the NFC read-write module is corresponding to multiple NFC induction antennas;

through the method of antenna switching, different NFC induction antennas are time-shared to be connected to the NFC read-write module to realize reading and writing of NFC labels corresponding to all NFC induction antennas; through the method of antenna switching, the number of NFC read-write modules is reduced.

2. The digital slide scanner sample identification device according to claim 1, wherein the number of NFC induction antennas is related to the maximum number of scanning samples that is accommodated by the digital slide scanner, to ensure that each scanning sample has a unique NFC induction antenna corresponding thereto.

3. The digital slide scanner sample identification device according to claim 1, wherein the number of the NFC read-write module is one or more; when the maximum number of scanning samples that is accommodated by the digital slide scanner is small, only one NFC read-write module is used; when the number of scanning samples is large, multiple NFC read-write modules are used; each NFC read-write module corresponds to reading and writing several NFC induction antennas, and multiple NFC read-write modules can work simultaneously to realize reading and writing of multiple NFC labels at the same time.

4. The digital slide scanner sample identification device according to claim 3, wherein the distance between the NFC read-write module and the corresponding NFC label is 0 mm-9 mm.

5. The digital slide scanner sample identification device according to claim 4, wherein a memory is arranged in the NFC label.

6. A sample identification method of the digital slide scanner according to claim 5, comprising the following steps:

equipment assembling: the equipment comprises a digital slide scanner and scanning samples, wherein a near-field communication NFC read-write module is arranged in the digital slide scanner, and a NFC label is arranged on each scanning sample; the digital slide scanner comprises an optical system, an illumination system, a mechanical system, and an electronic control system; from right to left of the digital slide scanner, it is sequentially a scan waiting area A, a scan imaging area C, and a scan completing area B;

data reading: the digital slide scanner communicates with the NFC label on each scanning sample through the near-field communication NFC read-write module, to access the relevant information of each scanning sample, which makes the digital slide scanner to obtain and memorize the relevant information and scanning status of each scanning sample, and makes the user to quickly locate and screen the position and relevant information of a specific sample in a large amount of scanning samples;

real-time monitoring: by reading and writing the NFC label on each scanning sample in real time, the digital slide scanner can perceive the user's operation on each scanning sample, such as loading a new scanning sample and taking out the scanned sample, and can accurately obtain the number of scanning samples in the current digital slide scanner; when the user needs to search for a specific sample, as long as the filtering conditions are entered, the digital slide scanner can compare the data of the read NFC label, quickly find the target sample, and give feedback through the indicator light or figure to inform the user of the specific location of the sample.

7. The digital slide scanner sample identification method according to claim 6, wherein in data reading, through the method of antenna switching, different NFC induction antennas are time-shared to be connected to the NFC read-write module to realize reading and writing of the NFC labels corresponding to all NFC induction antennas; through the method of antenna switching, the number of NFC read-write modules is reduced.

8. The digital slide scanner sample identification method according to claim 7, wherein the number of NFC induction antennas is related to the maximum number of scanning samples that is accommodated by the digital slide scanner, to ensure that each scanning sample has a unique NFC induction antenna corresponding thereto; through an antenna switching circuit, the NFC read-write module is only connected to one NFC induction antenna at any time, and then the NFC read-write module reads and writes the NFC label on the scanning sample corresponding to the NFC induction antenna; after completion, the antenna switching circuit is switched to the next NFC induction antenna; and so on, the reading and writing of NFC labels of all scanning samples are realized.

9. The digital slide scanner sample identification method according to claim 7, wherein the number of the NFC read-write module is one or more; when the maximum number of scanning samples that is accommodated by the digital slide scanner is small, only one NFC read-write module is used; when the number of scanning samples is large, multiple NFC read-write modules are used; each NFC read-write module corresponds to reading and writing several NFC induction antennas, and multiple NFC read-write modules can work simultaneously to realize reading and writing of multiple NFC labels at the same time, thereby shortening the time of traversal reading and writing all NFC labels.

10. The digital slide scanner sample identification method according to claim 7, wherein the distance between the NFC read-write module and the corresponding NFC label is 0 mm-9 mm.

11. The digital slide scanner sample identification method according to claim 7, wherein a memory is arranged in the NFC label.

* * * * *